Feb. 27, 1940.　　　A. S. NORCROSS　　　2,192,050
ALTERNATING CURRENT COMMUTATOR MOTOR
Filed Aug. 30, 1937　　　5 Sheets-Sheet 1

Inventor
Austin S. Norcross.
By Thomas A. Jenkes
Attorney

Feb. 27, 1940.  A. S. NORCROSS  2,192,050
ALTERNATING CURRENT COMMUTATOR MOTOR
Filed Aug. 30, 1937   5 Sheets-Sheet 2

Inventor.
Austin S. Norcross
By Thomas A. Jenks
Attorney

Feb. 27, 1940.  A. S. NORCROSS  2,192,050
ALTERNATING CURRENT COMMUTATOR MOTOR
Filed Aug. 30, 1937  5 Sheets-Sheet 3

Inventor
Austin S. Norcross.

By Thomas A. Jenckes
Attorney

Feb. 27, 1940.  A. S. NORCROSS  2,192,050
ALTERNATING CURRENT COMMUTATOR MOTOR
Filed Aug. 30, 1937  5 Sheets-Sheet 4

Inventor
Austin S. Norcross.
Thomas A. Jenkins
By
Attorney

Patented Feb. 27, 1940

2,192,050

UNITED STATES PATENT OFFICE 2,192,050

ALTERNATING CURRENT COMMUTATOR MOTOR

Austin S. Norcross, Newton, Mass.

Application August 30, 1937, Serial No. 161,614

24 Claims. (Cl. 172—276)

My invention relates to a novel type of motor design for improving the commutation and power factor of alternating current commutator motors. While the principles of my invention are particularly applicable to the single-phase motor described in my former Patent No. 2,060,106, operating either as an adjustable or as a constant speed motor, they are also applicable to polyphase or other types of commutator motors.

In all alternating current commutator motors there is a transformer voltage induced into the coils undergoing commutation. This objectional transformer voltage is in some cases almost completely neutralized by a speed voltage at synchronous speed. However, as the speed departs from synchronism the speed voltage changes so that the neutralization becomes less effective and consequently the commutation becomes continually poorer for higher or lower speeds. This factor usually limits the speed range that may be obtained from adjustable speed motors. By utilizing the principles of my invention it is possible to have nearly complete neutralization of the transformer voltage by a speed voltage throughout a wide speed range. In addition, employing my invention, an alternating current commutator motor may be operated as a constant speed motor having good commutation at a speed differing greatly from synchronism. Thus for example, by operating a two-pole motor considerably above synchronous speed, a very high speed motor may be obtained which has shunt speed characteristics and good commutation.

As an improvement on the type of single-phase motor shown in my former Patent No. 2,060,106, I adjust the voltage impressed upon the main and quadrature windings as described in said patent to obtain wide variations in speed, and in order to further increase the speed range, I vary the voltage impressed upon the armature winding. In order to provide desirable characteristics, particularly good commutation, over a wide speed range, I determined after much study that a motor constructed to operate in accordance with two definite formulas, which will be set forth later, would provide these desirable characteristics and then I determined that possible ways of keeping these equations both satisfied for different speeds would be to vary the different factors thereof in accordance with certain curves. I then designed a voltage regulator or controlling device which would supply voltages to the stator windings and armature winding in such predetermined combinations varying for different speeds in accordance with said curves as to cause the speed and transformer voltages induced into the armature coils undergoing commutation to be substantially equal at all speeds. Then it became merely a matter, if it be desired to design a constant speed motor to operate at a speed differing greatly from synchronism, of so arranging and connecting the windings that they would satisfy these two equations.

A further object of my invention is not only to design a motor in accordance with said equations which will operate over a wide range of speeds with improved commutation characteristics, but also to provide in combination therewith means to provide in the rotor a power factor improving component of voltage as well as to improve the power factor thereof. In the single-phase motor shown in my former patent, it is apparent that the capacitor itself provides means to provide in the rotor a power factor improving component of voltage. Employing my invention, however, in a polyphase motor, I preferably employ a means for improving the power factor easier to install and less expensive than a capacitor for each phase, preferably comprising power factor coils suitably connected in each rotor circuit and preferably energized from other phases. The power factor may also be improved by displacing the brushes from the axis of their respective stator windings. By using the power factor coils and by properly locating the brushes conjointly, I am able to maintain a high power factor and consequently high torque per ampere throughout a wide speed range.

Further features of my invention relate to improvements in various specific structures for carrying out the principles thereof.

These and such other objects of my invention as may hereinafter appear may be best understood from a description of the accompanying drawings which illustrate various embodiments thereof.

In the drawings, wherein like characters of reference generally indicate like parts throughout, Figs. 1–10 illustrate various embodiments of single-phase motors constructed in accordance with the principles of my invention, whereas Figs. 11–15 illustrate my invention applied to a three-phase motor. The different embodiments of single-phase alternating current motors shown in Figs. 1–10 are in most respects modifications of the single-phase motor described and claimed in my former Patent No. 2,060,106. In general the embodiments of my invention shown in Figs. 1–10 are constructed and operate in similar fashion to the embodiments of my invention shown in said patent. If a fuller description of the theory of such a motor be desired than set forth herein, including the equations and symbols involved, reference is hereby made to said patent.

Figure 1:
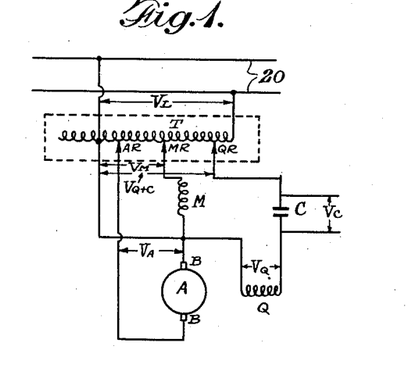
Fig. 1 is a circuit diagram of a single-phase adjustable speed motor of the type described in my former Patent No. 2,060,106, modified in accordance with my invention so that the armature may be adjustably connected to the autotransformer in order that the voltage impressed upon the armature circuit may be adjusted instead of having the armature short-circuited as shown in said patent with the voltages impressed upon the main winding and the quadrature winding each being independently adjustable.
Figure 2:
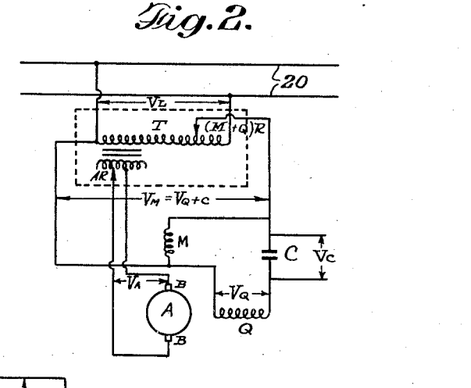
Fig. 2 is a circuit diagram of the single-phase adjustable speed motor shown in Fig. 1 modified so as to have the same voltage adjustably impressed upon both the main and quadrature windings.
Figure 3:
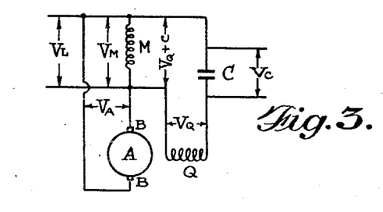
Fig. 3 is a circuit diagram of a constant speed motor constructed in accordance with my invention.

In the structure shown in Fig. 2 of said patent, I have provided adjustable means to supply voltage to the main stator winding and adjustable means to supply voltage to the quadrature winding. In the structure shown in said patent, however, the armature is permanently short-circuited. In order to improve the commutation throughout and to provide a greater speed range, I so modify the structure shown in my former patent as to adjustably vary the voltage also supplied to the armature winding. Instead of short-circuiting the armature A, I adjustably connect the armature to the auto-transformer T shown in Fig. 1 or to the transformer T shown in Fig. 2 to receive an adjustable voltage therefrom. In the type of single-phase alternating current motors shown in Figs. 1–3, I have employed and shown diagrammatically a motor with a main stator winding embodying a main coil M, which for convenience may be denominated the main coil or winding. A second or quadrature winding Q is located in quadrature or at ninety electrical degrees apart from said main winding. In other words, the coils M and Q are in space quadrature. For convenience, I will refer to the winding Q as the quadrature winding and to the windings M and Q together, namely the main and quadrature, as the stator windings.

In the particular embodiment shown in Fig. 1, voltage is impressed from the main line 20 or source of supply onto the auto-transformer T, where in turn it is impressed upon the main winding M and the quadrature winding Q as shown in said patent. By adjusting the positions of the riders MR and QR for the main winding and the quadrature winding on the auto-transformer shown in Fig. 1 or the single rider $(M+Q)R$ on the transformer shown in Fig. 2, the voltages impressed upon the main and quadrature windings may be varied as shown in said patent. As also shown in said patent, I provide means to provide in the rotor a power factor improving component of voltage comprising the capacitor C connected in the quadrature field circuit. As stated in said patent, the capacitor C, in addition to improving the power factor, improves the torque, commutation and other desirable characteristics of the motor.

The armature A rotates within the stator and is provided with a commutator having brushes B. Instead, however, of short-circuiting the armature as shown in said patent, I adjustably impress voltage upon the armature winding from the transformer or auto-transformer T by means of adjustably moving the supplemental rider AR relative to said transformer or auto-transformer. I have found in practice that by supplementally adjustably impressing or varying the voltage impressed upon the armature winding, I am enabled to increase the speed range and in general improve the operating characteristics of the motor.

The speed of this motor may be adjusted by controlling $\phi_M$ and $\phi_Q$ as described in the above-mentioned patent, or by controlling the voltage $V_A$ impressed upon the brushes. The voltage $V_A$ is substantially in phase with $E_{MT}$ above synchronous speed and in phase opposition to it below synchronous speed. It will be observed by referring to Fig. 3 of the above-mentioned patent that adding a voltage $V_A$ in phase with $E_{MT}$ will result in an increase in $E_{QS}$ and a corresponding increase in speed. Similarly adding a voltage $V_A$ in phase opposition to $E_{MT}$ will decrease $E_{QS}$ and the speed. Inasmuch as $V_M$ and $V_Q$ vary in proportion to $\phi_M$ and $\phi_Q$, the speed of this motor may therefore be adjusted by controlling any one or all three of the variables $V_M$, $V_Q$ and $V_A$, and may be approximately expressed by the following algebraic equation:

$$N = \frac{-I_a Z + K\phi_M f \pm V_A}{K\phi_Q}$$

where Z is the impedance of the armature circuit, $I_a$ equals the armature current. This expression assumes that $E_{QS}$ is in phase opposition to $E_{MT}$ which is substantially the case as $E_{QS}$ is only slightly displaced from this position to improve the performance of the motor.

Figure 4:
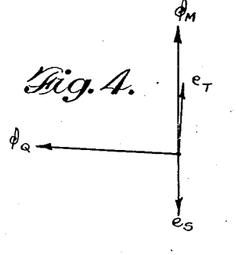
Fig. 4 is a vector diagram showing approximately the phase relations of the speed and transformer voltages induced into the coils undergoing commutation in all types of single-phase motors shown in Figs. 1, 2 and 3.

The resultant voltage induced into the coil undergoing commutation must be small to prevent brush sparking and excessive losses due to circulating currents. This resultant voltage is made up of a transformer voltage $e_t$ which is produced by the quadrature field flux and a speed voltage $e_s$ which is produced by the main field flux. In the case of the single-phase motor referred to, these two component voltages are substantially in phase opposition to each other as shown by Fig. 4 so that the best commutation is obtained when $e_t = e_s$ (2) where $e_t = K\phi_Q f$ and $e_s = K\phi_M n$.

Therefore, in adjusting the speed of the above-mentioned single-phase motor in accordance with Equation 1, it is advisable to adjust the controlling factors $\phi_M$, $\phi_Q$ and $V_A$ in such a manner as to approximately satisfy Equation 2. Furthermore, it is possible to adjust the quantities $\phi_M$, $\phi_Q$ and $V_A$ in such a way as to satisfy Equations 1 and 2 and at the same time maintain particular horsepower or torque characteristics. For instance, by adjusting $\phi_Q$ inversely proportional to the speed, the motor will be inherently a constant horsepower motor, while if $\phi_Q$ is maintained constant the motor will be inherently a constant torque motor.

Figure 5:
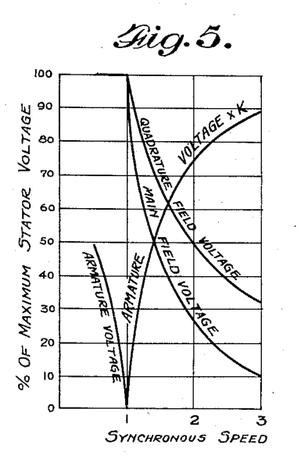
Fig. 5 is a graph showing a particular manner in which the voltages impressed upon the main, quadrature and armature windings of the single-phase motor shown in Fig. 1 may be adjusted in accordance with the curves shown therein to improve the commutation over a large speed range, the curves being determined on the basis of a constant torque below synchronous speed, I as shown therein, and on the basis of a constant horse power above synchronous speed.

In some cases it may not be practical to keep $e_t$ and $e_s$ exactly equal throughout the entire speed range. For example in Fig. 5, $V_M$, $V_Q$ and $V_A$ are adjusted to satisfy Equation 2 and maintain constant horse-power characteristics only above synchronous speed. To maintain the same horsepower characteristics and keep $e_s$ equal to $e_t$ below synchronous speed, excessive main and quadrature field fluxes would be required if the field fluxes were normal at synchronous speed. Under this condition it might be advisable to obtain the speeds below synchronism by keeping $V_M$ and $V_Q$ constant and adjusting $V_A$ as indicated in Fig. 5. While $e_s$ is not exactly equal to $e_t$ when this is done, the resultant voltage induced into the coil undergoing commutation is small for speeds from synchronous to one-half synchronous speed. Constant torque characteristics will then be obtained below synchronous speed.

There are other cases where it may not be practical to maintain $e_s$ exactly equal to $e_t$ throughout the speed range. For example, if $V_M$ is kept equal to $V_Q$ as indicated in Fig. 6, the auto-transformer is obviously simplified and the small difference between $e_s$ and $e_t$ in this case will not produce appreciable brush sparking throughout a large speed range.

The two component voltages $e_t$ and $e_s$ will be exactly in phase opposition when the two fields $\phi_M$ and $\phi_Q$ are in exact time quadrature. In this case the two oscillating fields are in both space and time quadrature and when they are equal a circular revolving field results which is identical with that obtained from a polyphase machine. It therefore should be evident that commutation in a polyphase motor is equivalent to that of a single-phase motor when the main and quadrature fields are equal and in time quadrature.

Figure 6:
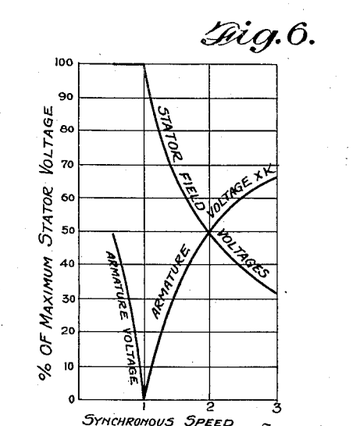
Fig. 6 is a graph showing a particular manner in which the voltages impressed upon the stator windings, including both the main and quadrature windings of the single-phase motor shown in Fig. 2 and the armature winding thereof may be adjusted to improve the commutation over a large speed range, the curves being determined on the basis of a constant torque below synchronous speed, I as shown therein, and on the basis of a constant horse power above synchronous speed.
Figure 11:
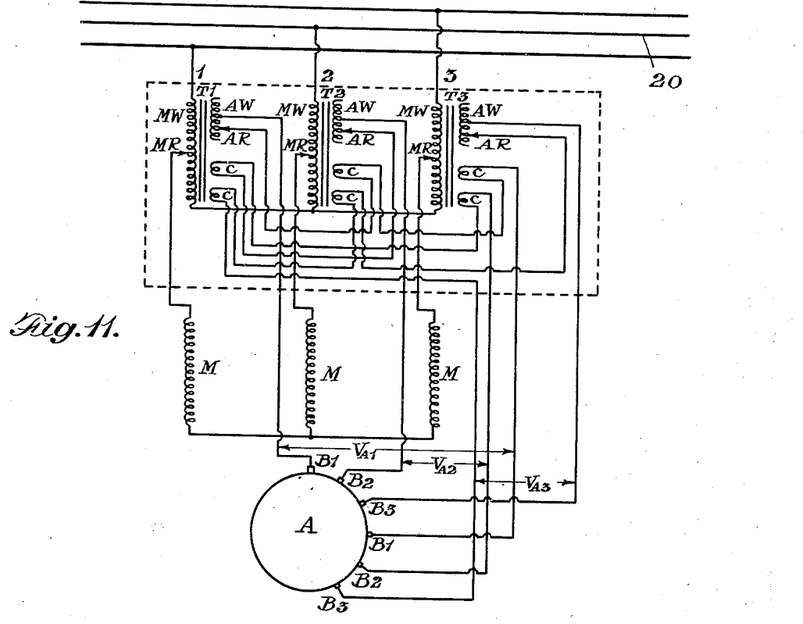
Fig. 11 is a circuit diagram of a three-phase adjustable speed motor constructed in accordance with my invention employing, however, power factor coils as the specific embodiment of means to provide in the rotor a power factor improving component of voltage.
Figure 13:
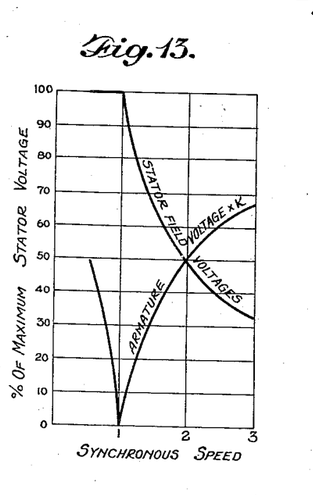
Fig. 13 is a graph showing a particular manner in which the voltages impressed upon the stator windings and armature windings of the polyphase motor shown in Fig. 11 may be adjusted to improve the commutation over a large speed range, and being generally similar to the graph shown in Fig. 6 for the types of single-phase motors shown herein, the curves being determined on the basis of a constant torque below synchronous speed, I as shown therein, and on the basis of a constant horse power above synchronous speed.

The conditions of Fig. 6 therefore are applicable to a polyphase motor where the voltages indicated are phase voltages as shown in Fig. 13. By means of a circuit arrangement, such as indicated in Fig. 11, the speed of a three-phase commutator motor may be adjusted by controlling the voltages impressed upon the stator and armature brushes in such a manner as to keep the difference between $e_s$ and $e_t$ small and thus maintain very good commutation over a large speed range.

Figs. 5 and 6 represent graphs of suitable ways to satisfy the Equations 1 and 2 in the manner hitherto explained. To obtain these curves from Equation 1 the term $I_a Z$ drop will obviously not be the same for different motors and those skilled in the art can modify these curves to take into consideration the voltage drop for any particular motor. As will be apparent from an inspection of Figs. 1 and 5, there are three variables, namely $V_M$, $V_Q$ and $V_A$. I have shown in Fig. 1 riders MR, QR and AR to adjustably contact the auto-transformer T to provide independent variation of each of these three variables. It is apparent that if a voltage regulator be provided which will supply voltages to each of the stator windings, including the main winding and quadrature winding and the armature winding, separately and independently, in such predetermined combinations varying for different speeds in accordance with these curves or other curves to satisfy the respective equations at different speeds, the speed and transformer voltages induced into the coils undergoing commutation will be substantially equal at all speeds.

I have shown in Figs. 7 and 8 a voltage regulator so constructed which I will describe in more detail later. To provide a simpler motor, as illustrated in Figs. 2 and 6, and keep $V_M$ equal to $V_Q$, the auto-transformer T shown in Fig. 1 may be simplified into the transformer T shown in Fig. 2 and the small difference between $e_s$ and $e_t$ in this case will not produce appreciable brush sparking throughout a large speed range.

I have shown in Fig. 6 a graph of suitable curves to satisfy the two above equations with the voltages impressed upon the main winding and quadrature maintained equal. With the three separately impressed voltages as shown in Fig. 1, the speed and transformer voltages induced into the coils undergoing commutation will be practically equal at all speeds as shown in the table later set forth. If, however, the same voltage be impressed upon the main winding and quadrature winding, the speed and transformer voltages induced into the coils undergoing commutation will vary slightly as shown in case 5 in said table, but for all practical purposes, as compared to all former types of motors, will be substantially equal to provide the desirable commutation characteristics of my invention. I therefore employ the words "practically equal" in the claims to satisfy case 4 of said table as attained in the embodiment shown in Figs. 1 and 5 of the drawings. I employ the words "substantially equal" to include case 5 shown in said table as attained in the embodiment shown in Figs. 2 and 6 of the drawings.

It is also apparent that by impressing the same voltage on the main and quadrature windings a much simpler voltage regulator may be provided which may be designed to act only for two instead of three variables. I have shown in Figs. 9 and 10 such a simplified voltage regulator which I will also describe in more detail later.

It is also apparent that instead of providing adjustable riders to vary the voltages impressed upon the armature, main and quadrature windings, either jointly or independently, said respective windings may be arranged and connected to the supply in such a predetermined combination as to cause the speed and transformer voltages induced into the coils undergoing commutation to be substantially equal at any speed above or below synchronism. This may be done by permanently fitting the adjustable riders against the desired points in the desired predetermined combination of a transformer or auto-transformer, in accordance with the curves shown in Fig. 5 or 6, or otherwise in accordance with said equations, or it may be done by varying the general design of the motor to cause it to operate in accordance with said equations. I have shown in Fig. 3 a constant speed motor constructed in accordance with my invention, with the desired number of turns in the respective main, quadrature and armature windings to satisfy said equations.

As stated hitherto, my invention is also applicable to a polyphase motor and I have shown in Fig. 11 a three-phase motor constructed in accordance with my invention. In such a motor there is provided a rotor A having a commutator armature winding, a stator having a separate stator winding M for each phase and a pair of brushes in contact with said commutator for each phase. In a polyphase motor of this description a quadrature winding is not necessary in order to produce the desired amount of torque, the desired amount of torque being provided by the relationship and connections of the respective various phase windings. The motors shown in Fig. 11, therefore, may be constructed in accordance with the curve shown in Fig. 6 to satisfy the two equations as shown in Fig. 13, which is a duplicate of Fig. 6. Thus in this type of motor, I adjust the voltage supplied to the stator windings M of each phase by means of riders MR in contact with the respective transformer T of each phase and I adjust the voltage supplied to said armature winding of each phase by means of riders AR also in contact with each respective transformer. I have shown in Figs. 14 and 15 a suitable voltage regulator to conjointly supply voltages to said stator and armature windings simultaneously in such predetermined combinations varying for different speeds as to cause the speed and transformer voltages induced into the coils undergoing commutation to be substantially equal at all speeds and substantially to satisfy said two equations, which I will describe in more detail later.

Figure 14:
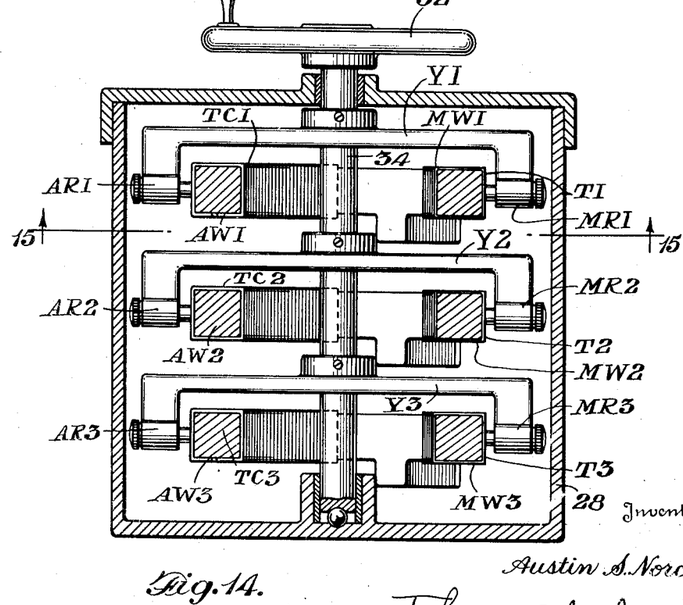
Fig. 14 is a vertical sectional view taken through a suitable voltage regulator, comprising three superimposed rings of the type shown in Figs. 9 and 10, one for each phase, rigidly mounted on a single shaft to be controlled by a single handle, for supplying voltages to the stator and armature windings of the embodiment of my invention shown in Fig. 11, adjustable to vary said impressed voltages for each phase in accordance with the graph shown in Fig. 13.
Figure 15:
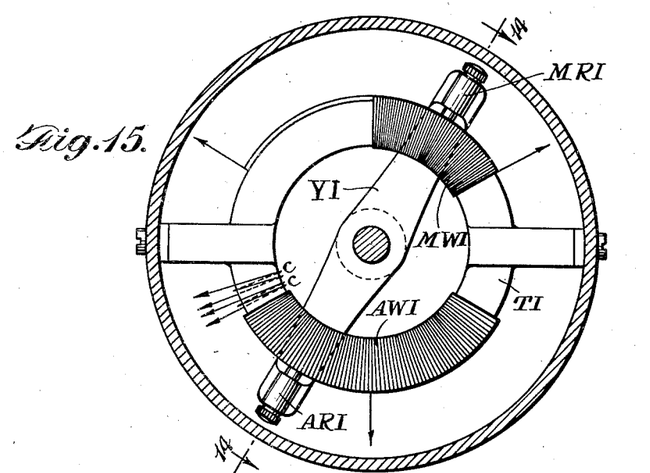
Fig. 15 is a cross sectional view taken along the line 15—15 of Fig. 14 and also showing the power factor improving coils.

I also provide means to provide in each rotor circuit a power factor improving component of voltage. In place of employing an expensive capacitor for this purpose, however, in the preferred embodiment shown I provide the power factor coils C in each rotor circuit which may be readily energized from other phases as shown. Furthermore, by displacing the brushes B1, B1, B2, B2 and B3, B3 for the respective phases from the axis of their respective stator windings, I may supplementally improve the power factor. The magnitude of the power factor improving component derived from said power factor improving coils and the power factor improving component of voltage derived by displacing the brushes is dependent upon the design of the motor and the speeds desired. It is evident that in general high power factor and high torque per ampere are inseparable and it is understood that the said means for producing a high power factor will also produce high torque per ampere because of the favorable phase relation between the armature currents and the torque-producing fluxes. The upper portion of the diagram shown in Fig. 11 diagrammatically illustrates the control which may comprise a linear transformer as diagrammatically illustrated therein having the adjustable riders MR for regulating the voltage impressed through the main winding MW and adjustable riders AR for regulating the voltage impressed through the armature winding AW for each phase, or each respective transformer T may comprise a ring auto-transformer as shown in Figs. 14 and 15.

Figure 12:
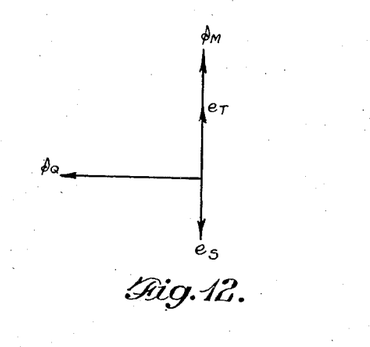
Fig. 12 is a vector diagram showing approximately the phase relations of the speed and transformer voltages induced into the coils undergoing commutation in the polyphase motor shown in Fig. 11, being substantially similar to the vector diagram shown in Fig. 4 for the various types of single-phase motors shown herein.

The revolving field set up by a polyphase motor is equivalent to a field produced by two oscillating fields $\phi_M$ and $\phi_Q$ which are equal and in time and space quadrature and thus may be represented by a vector diagram, as shown in Fig. 12, which also includes $e_t$ and $e_s$. This diagram is the same as that for a single-phase motor with the quadrature winding equal to and in time and space quadrature with the main winding.

Therefore, $\phi_M$ and $\phi_Q$ may be considered to exist in the armature whether produced by the main and quadrature windings of the single-phase motor or by the combined effect of the stator phase windings of a polyphase motor. However, in a polyphase motor $\phi_M$ and $\phi_Q$ are equal and in time and space quadrature, while in a single-phase motor $\phi_M$ and $\phi_Q$ may be unequal and not in exact quadrature as explained herein. It is understood, therefore, that $\phi_M$ and $\phi_Q$ used in Equation 1 are produced by the combined effect of the stator windings and that they are equal and in time and space quadrature in a polyphase motor.

Figs. 7–10 and 14–15 illustrate different voltage regulators which may be employed for adjusting the voltages impressed upon the various windings by a unitary control. Such regulators can be designed to supply adjustable voltages in any desired manner, such for example as are illustrated in Figs. 5 and 6. However, it may be practical for some applications to use a simpler controller using a system of links or gears which will approximate the voltage relations that may be obtained from the regulator. It is possible that linear voltage characteristics approximating voltage relations such as illustrated in Figs. 5 and 6 will in some cases be satisfactory and if such is the case, the controller is obviously simplified.

Figures 7, 8:
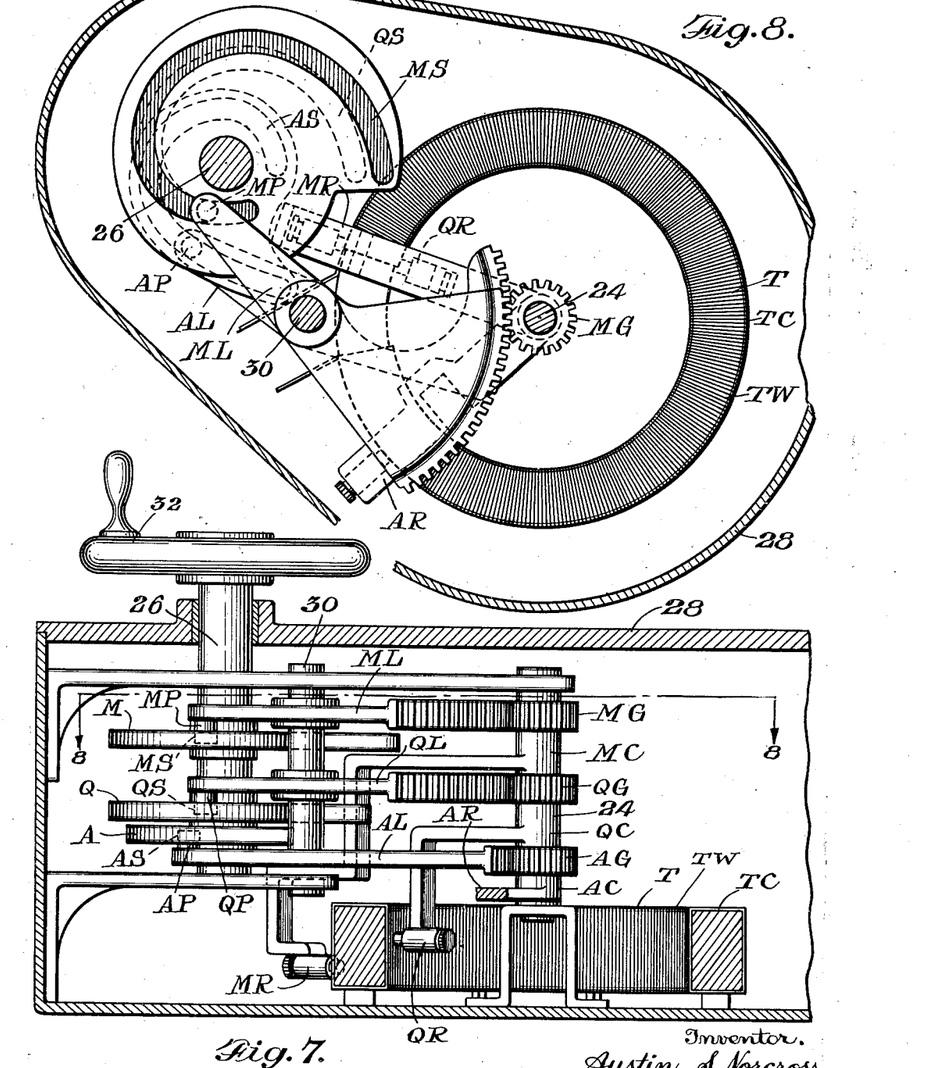
Fig. 7 is a vertical sectional view taken through a suitable voltage regulator for supplying separate voltages to the main winding, quadrature winding and armature winding of the embodiment of my invention shown in Fig. 1, adjustable to vary said impressed voltages in accordance with the graph shown in Fig. 5.
Fig. 8 is a cross sectional view taken along the line 8—8 of Fig. 7.

I have shown in Figs. 7 and 8 and diagrammatically illustrated in the upper portions of Figs. 1 and 2 a suitable type of voltage regulator to adjust the positions of the respective riders AR, MR and QR, separately and independently, relative to the transformer winding TW spirally wound around the transformer core TC to supply separate voltages to said main winding, quadrature winding and armature winding to satisfy said equations, or in such predetermined combinations varying for different speeds as to cause the speed and transformer voltages induced into the coils undergoing commutation to be substantially equal at all speeds in accordance with the respective armature voltage curve, main field voltage curve, and quadrature field voltage curve shown in Fig. 5. For this purpose the transformer T, in place of being linear as diagrammatically illustrated in Figs. 1 and 2, is made in the form of a ring rigidly mounted in the bottom of a casing and I mount a shaft 24 concentric with the center of the ring having a plurality of independently rotatable collars AC, QC and MC loosely mounted in superimposed relationship thereon. Each collar is provided with a respective gear AG, QG and MG and has a respective arm depending therefrom adapted to carry the respective riders AR, QR and MR to respectively contact the transformer winding on the transformer core TC. In the embodiment shown, the quadrature winding rider QR is adapted to contact the interior of the transformer core TC and the main rider MR and armature rider AR are adapted to contact respectively the exterior of said ring. A separate shaft 26 is independently mounted within the regulator box 28 and has rigidly mounted thereon the respective cams provided with the respective cam slots MS, main slot, QS, quadrature slot and AS, armature slot in the same superimposed relationship as the respective main collar MC, quadrature collar QC and armature collar AC are mounted on the shaft 24. A supplemental shaft 30 is also mounted within said regulator box 28 intermediate the shafts 24 and 26, and has loosely mounted thereon in the same superimposed respective relationship the main lever ML, the quadrature lever QL and the armature lever AL. The power arm of each of said levers is provided with a pin MP, QP or AP respectively, adapted to ride in the respective cam slots MS, QS and AS and at the opposite end thereof with respective gear segments adapted to mesh with and actuate the respective gears MG, QG, and AG on the respective collars MC, QC, and AC to actuate the respective riders MR, QR and AR relative to the transformer winding TW.

The upper end of the shaft 26 is provided with the turning handle 32. The cam slots MS, QS and AS are constructed exactly in accordance with the respective main voltage curve, quadrature voltage curve and armature voltage curve shown in Fig. 5. It is thus obvious that on rotation of the handle 32, the respective cams will be rotated so that the respective pins will ride in the respective cam slots to move the respective riders relative to the transformer winding separately and independently, substantially in accordance with the respective curves shown in Fig. 5, to supply voltages to said respective main, quadrature and armature windings substantially in accordance with the two equations and in such predetermined combinations varying for different speeds as to cause the speed and transformer voltages induced into the coils undergoing commutation to be substantially equal at all speeds.

Figure 9:
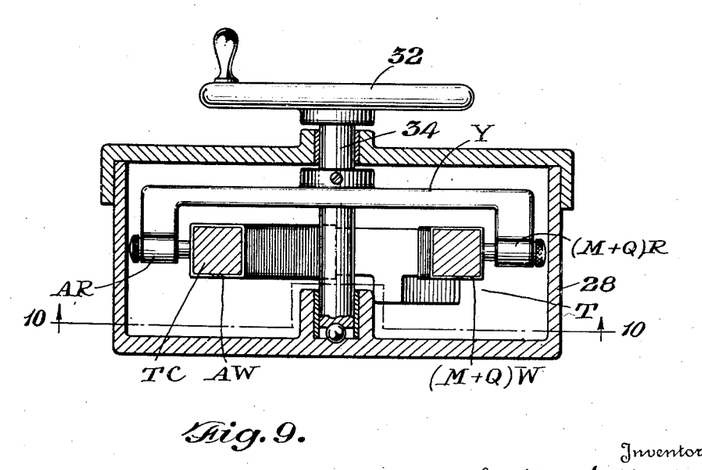
Fig. 9 is a vertical sectional view taken through a suitable voltage regulator for supplying voltages to the stator windings, including the main and quadrature windings of the embodiment of my invention shown in Fig. 2 and the armature winding thereof, adjustable to vary said impressed voltages in accordance with the graph shown in Fig. 6.
Figure 10:
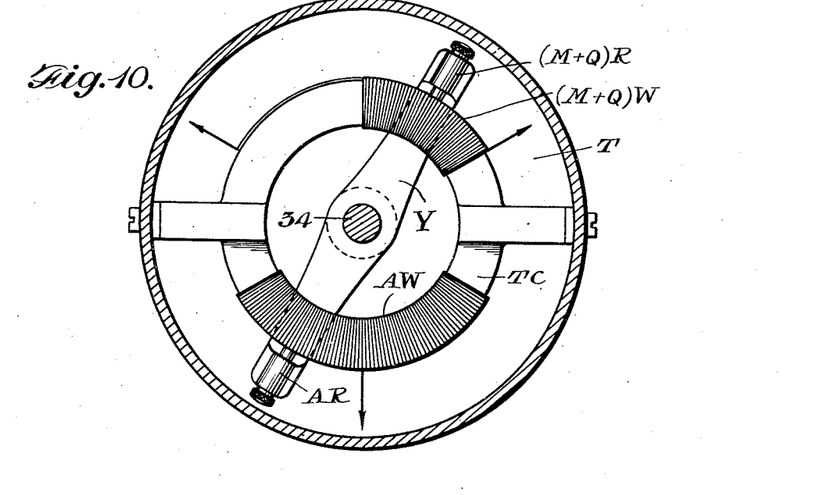
Fig. 10 is a cross sectional view taken along the line 10—10 of Fig. 9.

I have shown in Figs. 9 and 10 a voltage regulator adapted to function substantially in accordance with the graph shown in Fig. 6 to simultaneously vary the voltages supplied to the stator windings and the armature winding substantially in accordance with the two equations and in such predetermined combinations varying for different speeds as to cause the speed and transformer voltages induced into the coils undergoing commutation to be substantially equal at all speeds. As hitherto explained, in accordance with the graph shown in Fig. 6, I supply at all speeds equal voltages to the main and quadrature windings so that only one voltage curve is required for the different speeds. In place, therefore, of constructing different cams to regulate the movements of two different riders in accordance with different curves, I mount the respective riders $(M+Q)R$ and $AR$ diametrically of the ring T, and I arrange the respective windings $(M+Q)W$ and $AW$ on the transformer core TC, such as by varying the spacings and number of the turns or otherwise in accordance with their respective curves. Inasmuch as the percentage changes of movement desired in the respective rider $(M+Q)R$ and $AR$ are substantially equal to satisfy the curves shown in Figs. 6 and 13, it is obvious that the respective riders may be moved equally respective amounts to satisfy said curves and equations as shown in Figs. 9 and 10, the transformer T again being rigidly mounted in the transformer box 28. I provide a shaft 34 extending through the cover of the box having a diametric yoke Y mounted thereon having arms depending therefrom adapted to carry the respective riders AR and $(M+Q)R$ to contact the respective windings AW and $(M+Q)W$ diametrically of said ring on rotation of the handle 32 mounted on the upper end of said shaft 34.

I have shown in Figs. 14 and 15 a suitable type of control means for the polyphase motor shown in Fig. 11. Inasmuch as the respective riders MR and AR on the respective transformers T1, T2 and T3 for the three different phases may be adjusted simultaneously in accordance with the curves shown in Fig. 13, which as stated are similar to the curves shown in Fig. 6, a plurality of the control means shown in Figs. 9 and 10, which operate in accordance with the curves shown in Fig. 6 may be superimposed one upon each other for each transformer T1, T2 and T3 for each respective phase. Thus the respective transformer cores TC1, TC2 and TC3 are superimposed one above the other and a plurality of yokes Y1, Y2 and Y3 are rigidly mounted in the desired superimposed spaced relationship on the shaft 34 rotated in similar fashion as in Figs. 9 and 10 by the handle 32 to carry respectively and operate the respective riders MR1 and AR1, MR2 and AR2, and MR3 and AR3 respectively in equal diametric relationship in contact with the respective armature and main windings AW1 and MW1, AW2 and MW2, and AW3 and MW3 on the respective transformer cores TC1, TC2 and TC3. The respective windings on each core are similar to the windings hitherto described in Figs. 9 and 10 to satisfy the curves shown in Figs. 6 and 13. The respective power factor coils c in each rotor circuit are shown in Fig. 15 mounted adjacent one end of each respective armature winding.

In order that the advantages of my invention may be better understood, the following table is given to illustrate the degree of neutralization that may be realized for a few particular speeds obtained by five different methods of adjusting the motor speed.

Table

| Method of speed control | | Commutation voltages for different speeds expressed in number of times synchronous speed | | | |
|---|---|---|---|---|---|
| | | ½ | 1 | 2 | 3 |
| Case 1.—The speed is adjusted by varying $\phi_M$ with $V_A=0$ and $\phi_Q$ constant. | $e_t=$ | 1 | 1 | 1 | 1 |
| | $e_s=$ | .25 | 1 | 4 | 9 |
| | $e_t-e_s=$ | .75 | 0 | 3 | 8 |
| Case 2.—The speed is adjusted by varying $\phi_Q$ with $V_A=0$ and $\phi_M$ constant. | $e_t=$ | 2 | 1 | .5 | .33 |
| | $e_s=$ | .5 | 1 | 2 | 3 |
| | $e_t-e_s=$ | 1.5 | 0 | 1.5 | 2.6 |
| Case 3.—The speed is adjusted by varying $V_A$ with both $\phi_M$ and $\phi_Q$ constant. | $e_t=$ | 1 | 1 | 1 | 1 |
| | $e_s=$ | .5 | 1 | 2 | 3 |
| | $e_t-e_s=$ | .5 | 0 | 1 | 2 |
| Case 4.—The speed is adjusted as indicated in Fig. 5. | $e_t=$ | 1 | 1 | .5 | .33 |
| | $e_s=$ | .5 | 1 | .5 | .33 |
| | $e_t-e_s=$ | .5 | 0 | 0 | 0 |
| Case 5.—The speed is adjusted as indicated in Figs. 6 and 13 for single or three phase motors respectively. | $e_t=$ | 1 | 1 | .5 | .33 |
| | $e_s=$ | .5 | 1 | 1 | 1 |
| | $e_t-e_s=$ | .5 | 0 | .5 | .66 |

The magnitudes of the coil voltages involved are of course dependent upon the design of the motor. However, the transformer voltage induced into the coil undergoing commutation at synchronous speed is for convenience termed normal and expressed as unity and the resultant and component transformer and speed voltages are expressed as a decimal part of this normal voltage. The principles of this invention are used in Cases 4 and 5 where it will be observed that the resultant commutation voltages are much lower than in the Cases 1, 2 and 3 where the principles are not used.

Cases 4 and 5 are only to illustrate two particular combinations which utilize the basic idea of adjusting the voltages impressed upon the various circuits in combinations that will give the desired speeds and at the same time neutralize the transformer commutation coil voltage with a speed voltage adjusted to have substantially the same magnitude.

It should be obvious that these principles are applicable in many other forms for adjustable speed motors and are also useful for constant speed motors. For example, a very high constant speed motor may be obtained by operating a two-pole motor at a speed considerably greater than synchronism. In such a case the transformer may be entirely eliminated as in Fig. 3. This motor is particularly suitable for high speeds greater than 3600 R. P. M.

It is thus apparent that I have provided a control for an alternating current motor, whether it be of single or polyphase type, which may be either operated as an adjustable speed motor having the desired characteristics over a wider range of speeds than hitherto thought possible or which may be operated as a constant speed motor to operate in accordance with the principles of my invention and which may, if desired, be provided in combination therewith with means to provide in the rotor a power factor improving component of voltage and having the advantages explained above.

For convenience, I append a list of the symbols used in this specification in referring to the various electric forces considered.

$\phi_M$ = main field flux
$\phi_Q$ = quadrature field flux
$V_A$ = voltage impressed upon brushes
$E_{MT}$ = transformer voltage induced into armature from main field flux
$E_{QS}$ = speed voltage generated in armature from quadrature field flux
$V_Q$ = quadrature field voltage
$V_M$ = main field voltage
$N$ = speed
$I_a$ = armature current
$Z$ = impedance of armature circuit
$f$ = frequency
$e_t$ = transformer voltage induced into coil undergoing commutation
$e_s$ = speed voltage generated in coil undergoing commutation
$n$ = speed multiplied by number of pairs of poles
$K$ = constant It is understood that my invention is not limited to the specific embodiments illustrated herein and that various deviations may be made therefrom without departing from the spirit and scope of the appended claims.

What I claim is:

1. In combination, an alternating current motor comprising stator windings, a rotor having a coiled commutator armature winding, brushes in contact with said commutator, means to provide in the rotor a power factor improving component of voltage, and a voltage regulator connectable to a supply, comprising magnetic core means, winding means wound around said core means connectable to said supply, a plurality of cooperating power transmitting means, each individually connected to one of said stator windings or said armature winding and each mounted to individually move in respect to said core means and each capable of providing an independent variable voltage and unitary control means for simultaneously relatively moving the adjustable power transmitting means only in such a predetermined manner as to provide independent variable voltages in accordance with predetermined voltage and speed characteristics varying for different speeds as to cause the speed and transformer voltages induced into the coils undergoing commutation to be substantially equal at all speeds.

2. In combination, an alternating current motor comprising stator windings, a rotor having a coiled commutator armature winding, brushes in contact with said commutator, and a voltage regulator connectable to a supply, comprising magnetic core means, winding means wound around said core means connectable to said supply, a plurality of cooperating power transmitting means, each individually connected to one of said stator windings or said armature winding and each mounted to individually move in respect to said core means and each capable of providing an independent variable voltage and unitary control means for simultaneously relatively moving the adjustable power transmitting means only in such a predetermined manner as to provide independent variable voltages in accordance with predetermined voltage and speed characteristics varying for different speeds as to cause the speed and transformer voltages induced into the coils undergoing commutation to be substantially equal at all speeds.

3. In combination, an alternating current motor comprising a main winding, a rotor having a coiled commutator armature winding, brushes placed substantially along the axis of said main winding, a quadrature winding spaced ninety electrical degrees from the main winding, dephasing means in the circuit of the said quadrature winding comprising a capacitor of such magnitude as to dephase the circuit of the quadrature winding relative to that of the main winding by an amount to produce an angle having a cosine between .5 and 1 between the armature current and the quadrature field flux and a voltage regulator connectable to a supply, comprising magnetic core means, winding means wound around said core means connectable to said supply, a plurality of cooperating power transmitting rider means, each individually connected to the main winding, quadrature winding or armature winding and each mounted to individually move in respect to said core means in continuous contact with said winding means and each capable of providing an independent variable voltage and unitary control means for simultaneously relatively moving the adjustable rider means only in such a predetermined manner so as to provide independent variable voltages in accordance with predetermined voltage and speed characteristics varying for different speeds as to cause the speed and transformer voltages induced into the coils undergoing commutation to be substantially equal at all speeds.

4. In combination, an alternating current motor comprising a main winding, a rotor having a coiled commutator armature winding, brushes placed substantially along the axis of said main winding, a quadrature winding spaced ninety electrical degrees from the main winding, means for dephasing the current in said quadrature winding to produce an angle having a cosine between .5 and 1 between the armature current and the quadrature field flux and a voltage regulator connectable to a supply, comprising magnetic core means, winding means wound around said core means connectable to said supply, a plurality of cooperating power transmitting rider means, each individually connected to the main winding, quadrature winding or armature winding and each mounted to individually move in respect to said core means in continuous contact with said winding means and each capable of providing an independent variable voltage and unitary control means for simultaneously relatively moving the adjustable rider means only in such a predetermined manner so as to provide independent variable voltages in accordance with predetermined voltage and speed characteristics varying for different speeds as to cause the speed and transformer voltages induced into the coils undergoing commutation to be substantially equal at all speeds.

5. In combination, an alternating current motor comprising a main winding, a rotor having a coiled commutator armature winding, brushes placed substantially along the axis of said main winding, a quadrature winding spaced ninety electrical degrees from the main winding, means for dephasing the current in the quadrature winding to produce an angle having a cosine between .5 and 1 between the armature current and the quadrature field flux, and a voltage regulator connectable to a supply, comprising magnetic core means, winding means wound around said core means connectable to said supply, a plurality of cooperating power transmitting means, each individually connected to the main winding, quadrature winding or armature winding, at least one of said power transmitting means being movable in respect to said core means to provide variable voltages and unitary control means for moving the adjustable power transmitting means only in such a predetermined manner as to provide voltages in accordance with predetermined voltage and speed characteristics varying for different speeds as to cause the speed and transformer voltages induced into the coils undergoing commutation to be substantially equal at all speeds.

6. In combination, an alternating current motor comprising a main winding, a rotor having a coiled commutator armature winding, brushes placed substantially along the axis of said main winding, a quadrature winding spaced ninety electrical degrees from the main winding, means for dephasing the current in the quadrature winding to produce an angle having a cosine between .5 and 1 between the armature current and the quadrature field flux, and a voltage regulator connectable to a supply, comprising magnetic core means, winding means wound around said core means connectable to said supply, a plurality of cooperating power transmitting rider means, each individually connected to the main and quadrature windings, or said armature winding and each mounted to individually move in respect to said core means in continuous contact with said winding means and each capable of providing an independent variable voltage and unitary control means for simultaneously relatively moving the adjustable rider means only in such a predetermined manner so as to provide variable voltages in accordance with predetermined voltage and speed characteristics varying for different speeds as to cause the speed and transformer voltages induced into the coils undergoing commutation to be substantially equal at all speeds.

7. In combination, an alternating current motor comprising stator windings, a rotor having a coiled commutator armature winding, brushes in contact with said commutator, means to provide in the rotor a power factor improving component of voltage and a voltage regulator connectable to a supply, comprising magnetic core means, winding means wound around said core means connectable to said supply, a plurality of cooperating power transmitting means, each individually connected to one of said stator windings or said armature winding and each mounted to individually move in respect to said core means and each capable of providing an independent variable voltage and unitary control means for simultaneously relatively moving the adjustable power transmitting means to supply voltages to said stator windings and armature winding simultaneously substantially in accordance with the $e_t = e_s$ and $$N = \frac{-I_a Z + K\phi_M f \pm V_A}{K\phi_Q}$$

to provide the desired output characteristics.

8. In combination, an alternating current motor comprising stator windings, a rotor having a coiled commutator armature winding, brushes in contact with said commutator, and a voltage regulator connectable to a supply, comprising magnetic core means, winding means wound around said core means connectable to said supply, a plurality of cooperating power transmitting means, each individually connected to one of said stator windings or said armature winding, and each mounted to individually move in respect to said core means and each capable of providing an independent variable voltage and unitary control means for simultaneously relatively moving the adjustable power transmitting means to supply voltages to said stator windings and armature winding simultaneously substantially in accordance with the equations $e_t = e_s$ and $$N = \frac{-I_a Z + K\phi_M f \pm V_A}{K\phi_Q}$$

to provide the desired output characteristics.

9. In combination, an alternating current motor comprising a main winding, a rotor having a coiled commutator armature winding, brushes placed substantially along the axis of said main winding, a quadrature winding spaced ninety electrical degrees from the main winding, dephasing means in the circuit of said quadrature winding comprising a capacitor of such magnitude as to dephase the circuit of the quadrature winding relative to that of the main winding by an amount to produce an angle having a cosine between .5 and 1 between the armature current and the quadrature field flux, and a voltage regulator connectable to a supply, comprising magnetic core means, winding means wound around said core means connectable to said supply, a plurality of cooperating power transmitting rider means, each individually connected to the main winding, quadrature winding or armature winding and each mounted to individually move in respect to said core means in continuous contact with said winding means and each capable of providing an independent variable voltage and unitary control means for simultaneously relatively moving the adjustable rider means to supply voltages to said stator windings and armature winding simultaneously substantially in accordance with the equations $e_t = e_s$ and $$N = \frac{-I_a Z + K\phi_M f \pm V_A}{K\phi_Q}$$

to provide the desired output characteristics.

10. In combination, an alternating current motor comprising a main winding, a rotor having a commutator armature winding, brushes placed substantially along the axis of said main winding, a quadrature winding spaced ninety electrical degrees from the main winding, means for dephasing the current in said quadrature winding to produce an angle having a cosine between .5 and 1 between the armature current and the quadrature field flux, and a voltage regulator connectable to a supply, comprising magnetic core means, winding means wound around said core means connectable to said supply, a plurality of cooperating power transmitting rider means, each individually connected to the main winding, quadrature winding or armature winding and each mounted to individually move in respect to said core means in continuous contact with said winding means and each capable of providing an independent variable voltage and unitary control means for simultaneously relatively moving the adjustable rider means to supply voltages to said stator windings and armature winding simultaneously substantially in accordance with the equations $e_t = e_s$ and $$N = \frac{-I_a Z + K\phi_M f \pm V_A}{K\phi_Q}$$

to provide the desired output characteristics.

11. In combination, an alternating current motor comprising a main winding, a rotor having a coiled commutator armature winding, brushes placed substantially along the axis of said main winding, a quadrature winding spaced ninety electrical degrees from the main winding, means for dephasing the current in the quadrature winding to produce an angle having a cosine between .5 and 1 between the armature current and the quadrature field flux, and a voltage regulator connectable to a supply, comprising magnetic core means, winding means wound around said core means connectable to said supply, a plurality of cooperating power transmitting means, each individually connected to the main winding, quadrature winding or armature winding, at least one of said power transmitting means being movable in respect to said core means to provide variable voltages and unitary control means for moving the adjustable power transmitting means to supply voltages to said main winding, quadrature winding and armature winding simultaneously substantially in accordance with the equations $e_t = e_s$ and $$N = \frac{-I_a Z + K\phi_M f \pm V_A}{K\phi_Q}$$

to provide the desired output characteristics.

12. In combination, an alternating current motor comprising a main winding, a rotor having a coiled commutator armature winding, a quadrature winding spaced ninety electrical degrees from the main winding, brushes placed substantially along the axis of said main winding, means for dephasing the current in the quadrature winding to produce an angle having a cosine between .5 and 1 between the armature current and the quadrature field flux, and a voltage regulator connectable to a supply, comprising magnetic core means, winding means wound around said core means connectable to said supply, a plurality of cooperating power transmitting rider means, each individually connected to the main and quadrature windings or said armature winding and each mounted to individually move in respect to said core means in continuous contact with said winding means and each capable of providing an independent variable voltage and unitary control means for simultaneously relatively moving the adjustable rider means only to supply voltages to said main winding, quadrature winding and armature winding simultaneously substantially in accordance with the equations $e_t = e_s$ and $$N = \frac{-I_a Z + K\phi_M f \pm V_A}{K\phi_Q}$$

to provide the desired output characteristics.

13. In combination, a polyphase alternating current motor comprising a rotor having a coiled commutator armature winding, a stator winding for each phase, brushes in contact with said commutator for each phase, means to provide in each rotor circuit a power factor improving component of voltage energized from other phases, and a voltage regulator connectable to a supply, comprising magnetic core means, winding means wound around said core means connectable to said supply, a plurality of cooperating power transmitting rider means, each individually connected to the stator windings or the brushes for each phase and each mounted to individually move in respect to said core means in continuous contact with said winding means and each capable of providing an independent variable voltage and unitary control means for simultaneously relatively moving the adjustable rider means only in such a predetermined manner as to provide variable voltages in accordance with predetermined voltage and speed characteristics varying for different speeds as to cause the speed and transformer voltages induced into the coils undergoing commutation to be substantially equal at all speeds.

14. In combination, a polyphase alternating current motor comprising a rotor having a coiled commutator armature winding, a stator winding for each phase, brushes in contact with said commutator for each phase, and a voltage regulator connectable to a supply, comprising magnetic core means, winding means wound around said core means connectable to said supply, a plurality of cooperating power transmitting rider means, each individually connected to the stator windings or the brushes for each phase and each mounted to individually move in respect to said core means in continuous contact with said winding means and each capable of providing an independent variable voltage and unitary control means for simultaneously relatively moving the adjustable rider means only in such a predetermined manner as to provide variable voltages in accordance with predetermined voltage and speed characteristics varying for different speeds as to cause the speed and transformer voltages induced into the coils undergoing commutation to be substantially equal at all speeds.

15. In combination, a polyphase alternating current motor comprising a rotor having a coiled commutator armature winding, a stator winding for each phase, brushes in contact with said commutator for each phase, power factor coils in each rotor circuit to provide a power factor improving component of voltage in said rotor circuit energized from other phases and a voltage regulator connectable to a supply, comprising magnetic core means, winding means wound around said core means connectable to said supply, a plurality of cooperating power transmitting rider means, each individually connected to the stator windings or the brushes for each phase, and each mounted to individually move in respect to said core means in continuous contact with said winding means and each capable of providing an independent variable voltage and unitary control means for simultaneously relatively moving the adjustable rider means only in such a predetermined manner as to provide variable voltages in accordance with predetermined voltage and speed characteristics varying for different speeds as to cause the speed and transformer voltages induced into the coils undergoing commutation to be substantially equal at all speeds.

16. In combination, a polyphase alternating current motor comprising a rotor having a coiled commutator armature winding, a stator winding for each phase, means for connecting each stator winding to the supply, brushes in contact with said commutator for each phase, and power factor coils in each rotor circuit to provide a power factor improving component of voltage in said rotor circuit energized from other phases, a voltage regulator connectable to a supply, comprising magnetic core means, winding means wound around said core means connectable to said supply, a plurality of cooperating power transmitting means, each individually connected to the brushes for each phase and each mounted to individually move in respect to said core means and each capable of providing an independent variable voltage and unitary control means for simultaneously relatively moving the adjustable power transmitting means only in such a predetermined manner as to provide independent variable voltages in accordance with predetermined voltage and speed characteristics varying for different speeds as to cause the speed and transformer voltages induced into the coils undergoing commutation to be substantially equal at all speeds.

17. In combination, a polyphase alternating current motor comprising a rotor having a coiled commutator armature winding, a stator winding for each phase, brushes in contact with said commutator for each phase, means to provide in each rotor circuit a power factor improving component of voltage energized from other phases, and a voltage regulator connectable to a supply, comprising magnetic core means, winding means wound around said core means connectable to said supply, a plurality of cooperating power transmitting rider means, each individually connected to the stator windings or the brushes for each phase and each mounted to individually move in respect to said core means in continuous contact with said winding means and each capable of providing an independent variable voltage and unitary control means for simultaneously relatively moving the adjustable rider means to supply voltages to said stator windings and phase brushes simultaneously substantially in accordance with the equations $e_t = e_s$ and $$N = \frac{-I_a Z + K\phi_M f \pm V_A}{K\phi_Q}$$

to provide the desired output characteristics.

18. In combination, a polyphase alternating current motor comprising a rotor having a coiled commutator armature winding, a stator winding for each phase, brushes in contact with said commutator for each phase, and a voltage regulator connectable to a supply, comprising magnetic core means, winding means wound around said core means connectable to said supply, a plurality of cooperating power transmitting rider means, each individually connected to the stator windings or the brushes for each phase and each mounted to individually move in respect to said core means in continuous contact with said winding means and each capable of providing an independent variable voltage and unitary control means for simultaneously relatively moving the adjustable rider means to supply voltages to said stator windings and phase brushes simultaneously substantially in accordance with the equations $e_t = e_s$ and $$N = \frac{-I_a Z + K\phi_M f \pm V_A}{K\phi_Q}$$

to provide the desired output characteristics.

19. In combination, a polyphase alternating current motor comprising a rotor having a coiled commutator armature winding, a stator winding for each phase, brushes in contact with said commutator for each phase, power factor coils in each rotor circuit to provide a power factor improving component of voltage in said rotor circuit energized from other phases, and a voltage regulator connectable to a supply, comprising magnetic core means, winding means wound around said core means connectable to said supply, a plurality of cooperating power transmitting rider means, each individually connected to the stator windings or the brushes for each phase and each mounted to individually move in respect to said core means in continuous contact with said winding means and each capable of providing an independent variable voltage and unitary control means for simultaneously relatively moving said adjustable rider means to supply voltages to said stator windings and phase brushes simultaneously substantially in accordance with the equations $e_t = e_s$ and $$N = \frac{-I_a Z + K\phi_M f \pm V_A}{K\phi_Q}$$

to provide the desired output characteristics.

20. In combination, a polyphase alternating current motor comprising a rotor having a coiled commutator armature winding, a stator winding for each phase, means for connecting each stator winding to the supply, brushes in contact with said commutator for each phase, and power factor coils in each rotor circuit to provide a power factor improving component of voltage in said rotor circuit energized from other phases, a voltage regulator connectable to a supply, comprising magnetic core means, winding means wound around said core means connectable to said supply, a plurality of cooperating power transmitting means, each individually connected to the brushes for each phase and each mounted to individually move in respect to said core means and each capable of providing an independent variable voltage and unitary control means for simultaneously relatively moving the adjustable power transmitting means to supply voltages to said stator windings and phase brushes simultaneously substantially in accordance with the equations $e_t = e_s$ and $$N = \frac{-I_a Z + K\phi_M f \pm V_A}{K\phi_Q}$$

to provide the desired output characteristics.

21. In combination, an alternating current motor comprising stator windings, a rotor having a coiled commutator armature winding, brushes in contact with said commutator, means to provide in the rotor a power factor improving component of voltage, and a voltage regulator connectable to a supply, comprising magnetic core means, winding means wound around said core means connectable to said supply, a plurality of cooperating power transmitting means, each individually connected to one of said stator windings or said armature winding, at least one of said power transmitting means being movable in respect to said core means to provide variable voltages and unitary control means for moving the adjustable power transmitting means only in such a predetermined manner as to provide variable voltages in accordance with predetermined voltage and speed characteristics varying for different speeds as to cause the speed and transformer voltages induced into the coils undergoing commutation to be substantially equal at all speeds.

22. In combination, an alternating current motor comprising stator windings, a rotor having a coiled commutator armature winding, brushes in contact with said commutator, and a voltage regulator connectable to a supply, comprising magnetic core means, winding means wound around said core means connectable to said supply, a plurality of cooperating power transmitting means, each individually connected to one of said stator windings or said armature winding, at least one of said power transmitting means being movable in respect to said core means to provide variable voltages and unitary control means for moving the adjustable power transmitting means only in such a predetermined manner as to provide variable voltages in accordance with predetermined voltage and speed characteristics varying for different speeds as to cause the speed and transformer voltages induced into the coils undergoing commutation to be substantially equal at all speeds.

23. In combination, an alternating current motor comprising stator windings, a rotor having a coiled commutator armature winding, brushes in contact with said commutator, means to provide in the rotor a power factor improving component of voltage and a voltage regulator connectable to a supply, comprising magnetic core means, winding means wound around said core means connectable to said supply, a plurality of cooperating power transmitting means, each individually connected to one of said stator windings or said armature winding, at least one of said power transmitting means being movable in respect to said core means to provide variable voltages and unitary control means for moving the adjustable power transmitting means to supply voltages to said stator windings and armature winding simultaneously substantially in accordance with the equations $e_t = e_s$ and $$N = \frac{-I_a Z + K\phi_M f \pm V_A}{K\phi_Q}$$

to provide the desired output characteristics.

24. In combination, an alternating current motor comprising stator windings, a rotor having a coiled commutator armature winding, brushes in contact with said commutator, and a voltage regulator connectable to a supply, comprising magnetic core means, winding means wound around said core means connectable to said supply, a plurality of cooperating power transmitting means, each individually connected to one of said stator windings or said armature winding, at least one of said power transmitting means being movable in respect to said core means to provide variable voltages and unitary control means for moving the adjustable power transmitting means to supply voltages to said stator windings and armature winding simultaneously in accordance with the equations $e_t = e_s$ and $$N = \frac{-I_a Z + K\phi_M f \pm V_A}{K\phi_Q}$$

to provide the desired output characteristics.

AUSTIN S. NORCROSS.